(12) United States Patent
Chittoor et al.

(10) Patent No.: US 9,779,443 B1
(45) Date of Patent: Oct. 3, 2017

(54) EVENT-BASED PERSONALIZED MERCHANDISING SCHEMES AND APPLICATIONS IN MESSAGING

(71) Applicant: Blueshift Labs, Inc., San Francisco, CA (US)

(72) Inventors: Vijay Chittoor, San Carlos, CA (US); Mehul Shah, Fremont, CA (US); Subramanyam Mallela, Albany, CA (US); Olivier Van Laere, San Francisco, CA (US); Cibin George, San Francisco, CA (US); Aswani Nerella, San Francisco, CA (US)

(73) Assignee: BLUESHIFT LABS, INC., San Francisco, CA (US)

( * ) Notice: Subject to any disclaimer, the term of this patent is extended or adjusted under 35 U.S.C. 154(b) by 0 days.

(21) Appl. No.: 15/167,655

(22) Filed: May 27, 2016

(51) Int. Cl.
  *G06Q 30/06* (2012.01)
  *H04L 29/08* (2006.01)

(52) U.S. Cl.
  CPC ......... *G06Q 30/0631* (2013.01); *G06Q 30/06* (2013.01); *G06Q 30/0601* (2013.01); *G06Q 30/0603* (2013.01); *G06Q 30/0621* (2013.01); *G06Q 30/0641* (2013.01); *H04L 67/32* (2013.01)

(58) Field of Classification Search
  CPC ........... G06Q 30/0601–30/0645; G06Q 30/08
  USPC .............................................. 705/26.1–27.2
  See application file for complete search history.

(56) References Cited

U.S. PATENT DOCUMENTS

| | | |
|---|---|---|
| 8,447,747 B1 | 5/2013 | Yi et al. |
| 2002/0032597 A1 | 3/2002 | Chanos |
| 2002/0077927 A1 | 6/2002 | Lasnier et al. |
| 2002/0147645 A1 | 10/2002 | Alao et al. |
| 2002/0156688 A1 | 10/2002 | Horn et al. |
| 2003/0028451 A1 | 2/2003 | Ananian |
| 2004/0093268 A1 | 5/2004 | Ramchandani et al. |
| 2006/0212350 A1 | 9/2006 | Ellis et al. |
| 2007/0100688 A1 | 5/2007 | Book |
| 2008/0097842 A1 | 4/2008 | Tirumala et al. |
| 2008/0097843 A1 | 4/2008 | Menon et al. |
| 2008/0097847 A1 | 4/2008 | Perkowski et al. |
| 2009/0055267 A1 | 2/2009 | Roker |
| 2009/0198507 A1* | 8/2009 | Rhodus ............... G06Q 30/02 705/14.66 |
| 2009/0287559 A1 | 11/2009 | Chen et al. |
| 2011/0016010 A1 | 1/2011 | Mesaros |

(Continued)

OTHER PUBLICATIONS

"BlueShift Documentation", BlueShift Labs, Inc., Wayback Machine archived Mar. 17, 2015 to Apr. 5, 2015 and accessed on Sep. 16, 2016, from derivatives of www.getblueshift.com/documentation/*, actual url listed on pdf., pp. 1-21.*

Mobasher; et al., "Effective Personalization Based on Association Rule Discovery from Web Usage Data", 3rd ACM Workshop on Web Information and Data Management (Nov. 9, 2001), Atlanta, Georgia, 7 pgs.

(Continued)

*Primary Examiner* — Resha Desai
*Assistant Examiner* — Lindsey Smith
(74) *Attorney, Agent, or Firm* — Ascenda Law Group, PC

(57) ABSTRACT

Systems and methods for designing personalized merchandising schemes that are responsive to events received in an event stream may provide, for example, one or more graphical user interfaces by which to receive parameters for a personalized merchandising scheme from a designer. Messages may be selected for delivery to a user responsively to an event according to a defined personalized merchandising scheme.

22 Claims, 15 Drawing Sheets

(56) References Cited

U.S. PATENT DOCUMENTS

| | | |
|---|---|---|
| 2011/0243553 A1 | 10/2011 | Russell |
| 2011/0258027 A1 | 10/2011 | Lee et al. |
| 2014/0143172 A1 | 5/2014 | Richter et al. |
| 2015/0039565 A1* | 2/2015 | Lucas ............... G06F 17/30595 707/667 |
| 2015/0312311 A1* | 10/2015 | Subramanian ...... G06F 17/3051 709/223 |

OTHER PUBLICATIONS

Schafer; et al., "E-Commerce Recommendation Applications", Data Mining and Knowledge Discover (2001), 5:115-153.

Yan; et al., "How much can Behavioral Targeting Help Online Advertising?", The 18th Int. World Wide Web Conferences (WWW 2009), Apr. 20-24, 2009, Madrid, Spain, p. 261-270.

"Real Time Segmentation", Blueshift Labs, Inc., Wayback Machine archived Mar. 17, 2015, from web page: https://web.archive.org/web/20150317060026/http://www.getblueshift.com/real-time-segmentation/, 1 pg.

"Predictive Intelligence", Blueshift Labs, Inc., Wayback Machine archived Mar. 17, 2015, from web page: https://web.archive.org/web/20150317060853/http://www.getblueshift.com/predictive-intelligence/, 1 pg.

"Documentation", Blueshift Labs, Inc., Wayback Machine archived Mar. 17, 2015, from web page: https://web.archive.org/web/20150317051915/http://www.getblueshift.com/documentation/, 3 pgs.

* cited by examiner

FIG. 5C

EVENT-BASED PERSONALIZED MERCHANDISING SCHEMES AND APPLICATIONS IN MESSAGING

FIELD OF INVENTION

The present invention relates to an improvement in computer-related technology. More specifically, the present invention relates to systems and methods for designing personalized merchandising schemes that are responsive to events received in an event stream and systems and methods for providing a message defined by a personalized merchandising scheme to a user associated with a particular event received in an event stream.

BACKGROUND

Online advertising methods for e-commerce platforms typically use historically collected information regarding user-purchasing behavior to design and target their advertising campaigns. In a typical circumstance, data regarding a user's interaction with, for example, a website is gathered and then this information is used to generate a historical profile of a particular user or aggregate users of the website. These profiles are then used to develop new advertising campaigns and/or match users with particular advertisements.

SUMMARY

Provided herein are systems and methods for designing personalized merchandising schemes that are responsive to events received in an event stream and systems and methods for providing a message defined by a personalized merchandising scheme to a user associated with a particular event received in an event stream.

In one embodiment, a catalog including information regarding each of a plurality of goods or services may be received. In some instances, a designer of a personalized merchandising scheme may provide the catalog.

A plurality of personalized merchandising schemes may also be received. Each of the personalized merchandising schemes defines content for a message that references information regarding a good or service included in the catalog, criteria for selection of an event from an event stream to which the message is responsive, a format for the content of a message, and a channel of communication for the message. In some cases, some, or all, of the personalized merchandising scheme may be defined via a graphic user interface ("GUI") that enables a designer to define a set of parameters for a personalized merchandising scheme. In some embodiments, criteria for selection of an event from an event stream to which the message is responsive may include inclusion of a first characteristic in the event and exclusion of second characteristic from the event.

An event stream including a plurality of user-initiated events may be received. Each of the events in the event stream may be associated with one or more event characteristics and an individual user. The events may represent user interactions with the catalog and, in some cases, may be received from a plurality of user devices. In some embodiments, the event stream to normalize the events is received into a common format.

Then, a characteristic of a particular event in the event stream may be determined. In some instances, the determination may include executing a batch process that iterates over time as events are received over time using one or more machine learning processes. At times, the determination may also include building an interaction graph as explained in greater detail below with regard to FIG. 3 by executing at least one of a representational state transfer ("REST") application programming interface ("API"), a batch process, and a real-time indexing process.

A personalized merchandising scheme may then be selected from the plurality of personalized merchandising schemes responsively to the determination and a message defined by the selected personalized merchandising scheme may be provided to a user associated with the particular event.

In some embodiments, a data structure that indexes a status for one or more users associated with events in the event stream may be created. The data structure and/or index may be updated to indicate an ongoing status of one more users associated with one or more events over time. In some instances, the updating may reflect a change in a status for an indexed user as indicated by a subsequently received event in the event stream associated with the respective indexed user.

In some instances, a plurality of messages that comply with a corresponding plurality of personalized merchandising schemes may be preconfigured. A data structure that stores the plurality of messages may then be built and selecting the personalized merchandising scheme may further include accessing a preconfigured message stored in the data structure that corresponds with the selected personalized merchandising scheme and providing the message includes communicating the accessed preconfigured message to the user associated with the particular event.

In an alternate embodiment, a catalog including information regarding each of a plurality of goods or services may be received. In some instances, a designer of a personalized merchandising scheme may provide the catalog.

A plurality of personalized merchandising schemes may also be received. Each of the personalized merchandising schemes defines content for a message that references information regarding a good or service included in the catalog, criteria for selection of an event from an event stream to which the message is responsive, a format for the content of a message, and a channel of communication for the message. In some cases, some, or all, of the personalized merchandising scheme may be defined via a graphical user interface ("GUI") that enables a designer to define a set of parameters for a personalized merchandising scheme.

A data structure that correlates personalized merchandising schemes with event data may then be generated. In some cases, a designer may use the GUI to define one or more aspects of the data structure. An event stream may then be received from, for example, a plurality of user devices. The event stream may include a plurality of user-initiated events and each of the events in the event stream may be associated with one or more event characteristics and an individual user.

In some instances, building the data structure may include normalizing the events received into a common format and/or building an interaction graph by executing at least one of a representational state transfer ("REST") application programming interface ("API"), a batch process, and a real-time indexing process.

The data structure may then be accessed to retrieve a personalized merchandising scheme that correlates with a particular event included in the event stream and a message may be generated according to the retrieved personalized merchandising scheme and communicated to a user associated with the particular event.

In some embodiments, a data structure that indexes a status for one or more users associated with events in the event stream may be created. The data structure and/or index may be updated to indicate an ongoing status of one more users associated with one or more events over time. In some instances, the updating may reflect a change in a status for an indexed user as indicated by a subsequently received event in the event stream associated with the respective indexed user.

In some instances, a plurality of messages that comply with a corresponding plurality of personalized merchandising schemes may be preconfigured. A data structure that stores the plurality of messages may then be built and selecting the personalized merchandising scheme may further include accessing a preconfigured message stored in the data structure that corresponds with the selected personalized merchandising scheme and providing the message includes communicating the accessed preconfigured message to the user associated with the particular event.

In yet another embodiment, a designer may be provided with an interface via which parameters for a personalized merchandising scheme may be defined. Exemplary parameters include content for a message, criteria for selection of an event from an event stream to which the message is responsive, a format for the content of a message, and a channel of communication for the message.

One or more parameters for defining the personalized merchandising scheme may be received and a data structure for the personalized merchandising scheme may be created in a computer memory using the received defined parameters.

BRIEF DESCRIPTION OF THE DRAWINGS

The present application is illustrated by way of example, and not limitation, in the figures of the accompanying drawings, in which.

Figure 1:
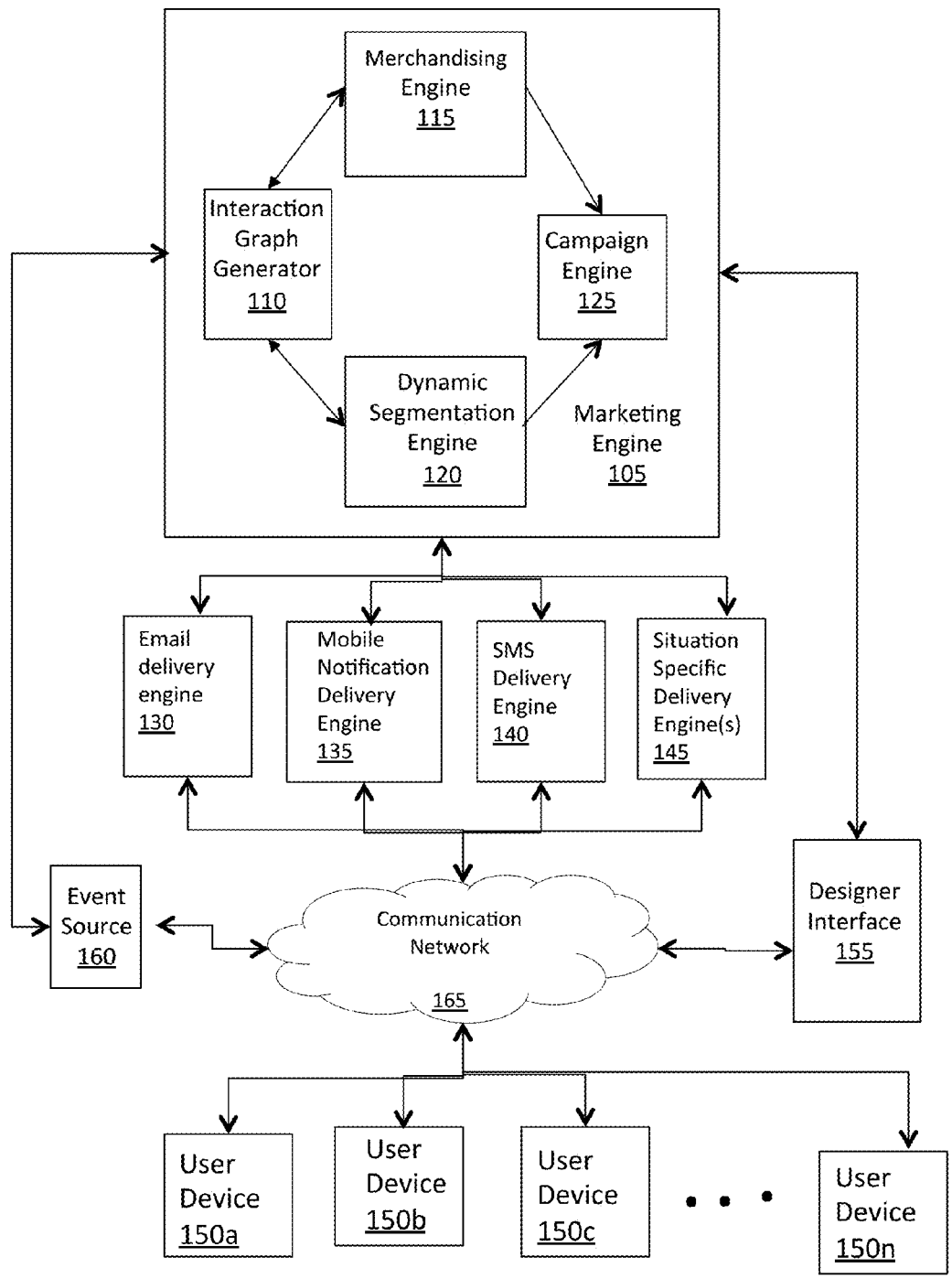
FIG. 1 is a block diagram of a system, in accordance with some embodiments of the invention.

Throughout the drawings, the same reference numerals and characters, unless otherwise stated, are used to denote like features, elements, support structures, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

Described herein are systems and methods for designing personalized merchandising schemes that are responsive to events received in an event stream. Also described herein are systems and methods for selecting and providing a message that is defined by a personalized merchandising scheme to a user associated with an event that matches the criteria of the personalized merchandising scheme. As disclosed herein, the term "personalized" is meant to convey that a merchandising scheme is tailored, or personalized, to include a specific set of criteria and instructions regarding, for example, events to which a merchandising scheme is responsive and is not meant to convey that a merchandising scheme is "personalized" to a particular user or designer using personal attributes (e.g., name).

Figure 2A:
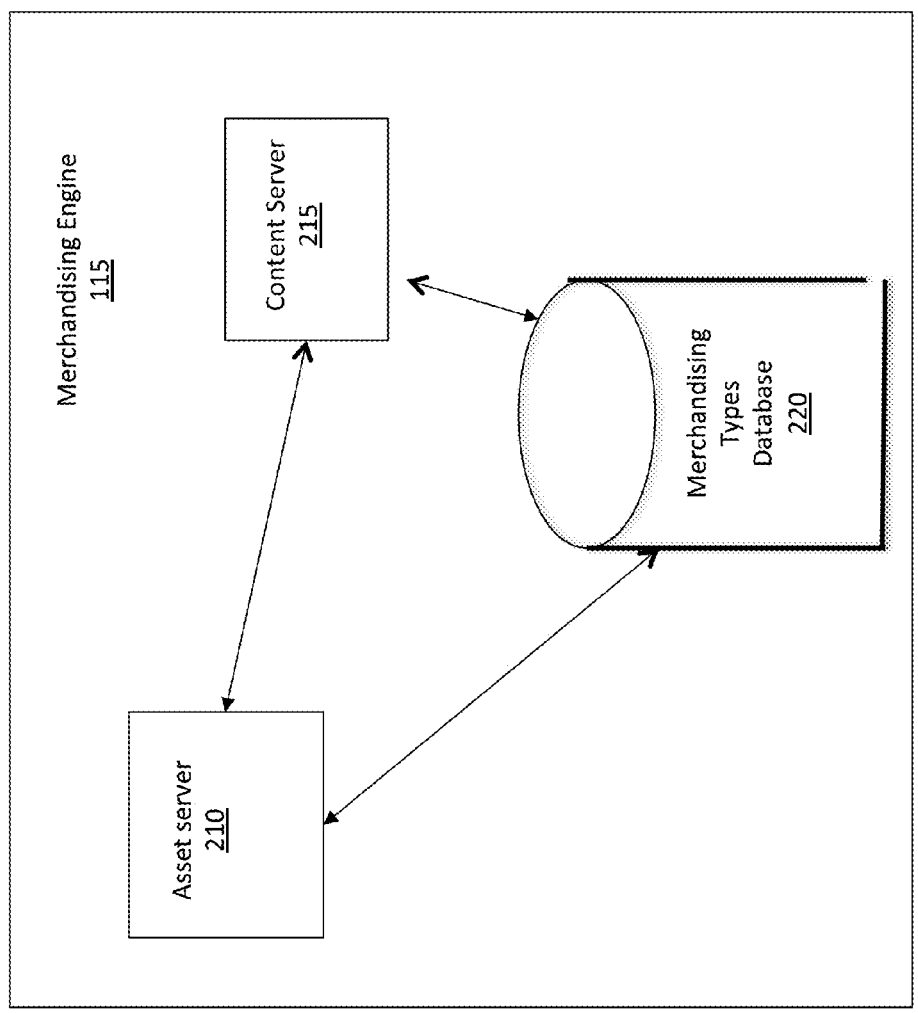
FIG. 2A is a block diagram of a merchandising engine, in accordance with some embodiments of the invention.
Figure 2B:
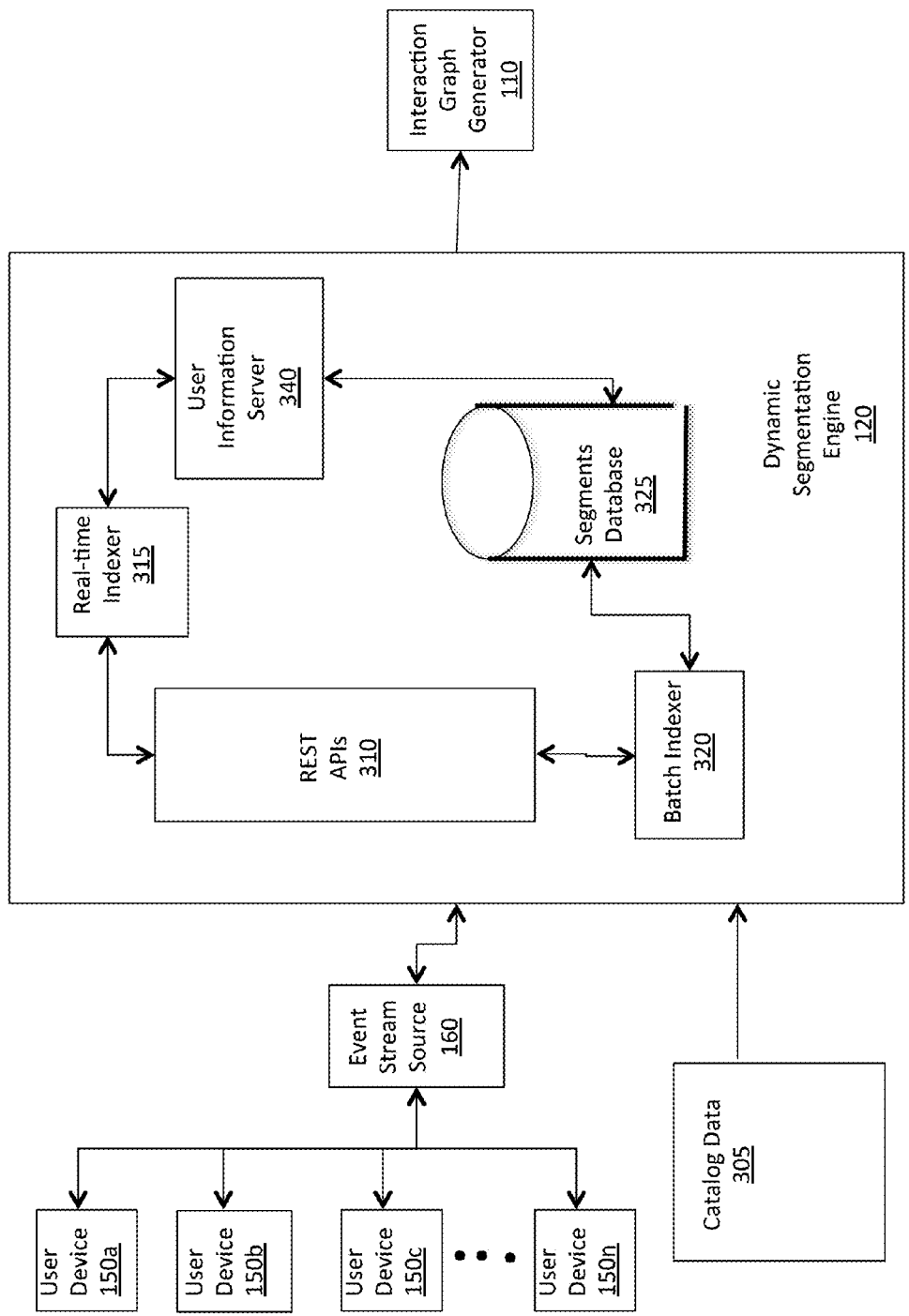
FIG. 2B is a block diagram of a dynamic segmentation engine, in accordance with some embodiments of the invention.

FIGS. 1-2B provide diagrams of an exemplary system as well as exemplary system components that may be used to execute the processes described herein. More specifically, FIG. 1 provides a block diagram of an exemplary system 100 for designing personalized merchandising schemes that are responsive to events received in an event stream and/or providing a message that is defined by a personalized merchandising scheme to a user, or a group of users, associated with an event that matches the criteria of the personalized merchandising scheme. A group of users may be of any appropriate size desired by, for example, a personalized merchandising scheme designer or an advertiser.

System 100 includes a marketing engine 105, an email delivery engine 130, a mobile notification delivery engine 135, a short message service ("SMS") delivery engine 140, one or more situation specific delivery engine(s) 145, a plurality of user devices 150a-150n, an event source 160, a designer interface 155, and a communication network 165. Exemplary components for marketing engine 105 include an interaction graph generator 110, a merchandising engine 115, a dynamic segmentation engine 120, and a campaign engine 125.

Communication between any of the components of the system 100 may be facilitated via, for example, a wired and/or wireless communication link. Marketing engine 105 may include one or more computers, processors, servers, and databases etc. that are in communication with one another. Marketing engine 105 may prepare one or more tailored, or event specific, advertisements and/or messages for delivery to a user device, such as user device 150a-150n via one or more of email delivery engine 130, mobile notification delivery engine 135, SMS delivery engine 140, and situation specific delivery engine(s) 145.

Exemplary user devices 150a-150n include, but are not limited to, personal computers, laptop computers, tablet computers, smart watches, and smart phones. User devices 150a-150n may provide an event stream to event stream source 160 and/or marketing engine 105. The event stream may include a series of communications by various users as they interact with, for example, a product catalog or an educational program via a communication network, such as communication network 165, or the Internet. Often times, the event will be, in some way, associated with a designer using the designer interface 155. Exemplary designers include, but are not limited to, catalog owners, marketing executives, advertisers, consumers of advertising services, consumers of messaging services, and so on.

The events of the event stream may be caused by user interaction with, for example, a website, a mobile software application, a point of sale device, or may be tracked by a backend system such as spyware or cookies operating on a user device 150a-150n. Exemplary events included in an event stream include, but are not limited to a user taking one or more of the following actions: purchasing a good or service, placing an item into an electronic shopping cart, accessing additional information about a product or service, activating an icon on a graphical user interface, selecting an image on a graphical user interface, viewing an item via a webpage, and so on. The event data may be associated with various characteristics of the event including, but not limited to, the type of user device 150a-150n the event is received from, a geo-location of the user device 150a-150n, demographic information related to a user of a particular account and/or user device 150a-150n, etc.

One or more designers (i.e., entities that want to send messages to users) who are observing/recording the events taking place on the user devices 150a-150n as they interact with, for example, a website operated by a particular designer, may communicate the event stream to the marketing engine 105 via event source 160. Designers may send the event stream from, for example, their website using, for example, JAVASCRIPT™ tags, one or more software development kits ("SDK") for mobile apps, and/or a backend application programming interface ("API").

FIG. 2A is a block diagram illustrating exemplary components for merchandising engine 115, such as an asset server 210, a content server 215, and a merchandising types database 220.

Asset server 210 may include and/or be communicatively coupled to one or more asset databases (not shown) that may store information regarding how a message communicated to a user should look in, for example, images, formatting information, and/or code written in HTML or JSON that informs how a message should look or what it should contain. Asset server 210 may store and/or access information to be included in a message and/or components of a message such as message formatting, styling, and content for a plurality of messages, personalized merchandising schemes, and/or messaging campaigns. For example, asset server 210 may include one or more message templates (e.g., email templates, SMS text messaging templates, etc.) and content to add to a messaging template such as a logo, information to identify the sender of the message, information used to personalize the message to the user, a color scheme for the message, etc. In some embodiments, asset server may generate/store/access preconfigured messages tailored to one or more personalized merchandising schemes.

Asset server 210 may also store catalog information for various products, services, or other content to be delivered to a message recipient. For example, asset server 210 and/or a database that is communicatively coupled to asset server 210 may store and/or provide to other components of merchandising engine 115 and/or system 100 data for individual products or services. For example, asset server 210 may store/provide access to a variety of details regarding a retailer's product catalog including, but not limited to identifying information for products and/or service (e.g., stock keeping unit ("SKU") numbers, serial numbers, vehicle identification numbers (VIN)), price, quantity available, product characteristics, and so on.

Merchandising types database 220 includes information regarding the types of personalization selected/defined by a designer by way of the message campaign and/or personalized merchandising scheme they designed using the campaign engine 125. The merchandising types database 220 may include information defining the type of messages to be delivered to a user associated with a particular event that has a particular characteristic or combination of characteristics. For example, a designer may design a messaging campaign and/or personalized merchandising scheme that defines various aspects of the campaign and/or personalized merchandising scheme via interaction with the campaign engine 125. The campaign engine 125 may then fetch information and specifics for tailoring the message from the merchandising types database 220.

FIG. 2B is a block diagram illustrating exemplary components for dynamic segmentation engine 120, which includes one or more representational state transfer ("REST") APIs 310, a database that stores catalog data 305, a real-time indexer 315, and a batch indexer 320. FIG. 2B also illustrates exemplary communication pathways between components of the dynamic segmentation engine 120 and the user devices 150a-150n, event stream source 160, and interaction graph generator 110.

The catalog database 305 may store a variety of data for a plurality of designers including, but not limited to, information regarding an e-commerce platform used by one or more designers, a content management system ("CMS"), used by one or more designers, catalog data regarding products or services offered by one or more designers, etc. In the instance where a designer is an e-commerce retailer, catalog data may include product information, inventory information, pricing, storage information for the product, logistical information regarding delivering the product to a particular user, etc.

Information communicated by the catalog database 305 may be referred to as a catalog feed. The catalog feed is communicated to the REST APIs 310 and may be used to analyze the event stream received from event stream source 160. In addition, the REST APIs may act to normalize the events included in the event stream so that they may be understood and used by the remaining components of system 100, including real time indexer 315 and batch indexer 320. REST APIs may also orchestrate various back end components and/or extract information from particular events in the event stream based on one or more characteristics (e.g., type of event, geo-location of event's occurrence, etc.) of the event.

Once the REST APIs 310 have processed the events, they are communicated to real-time indexer 315 and batch indexer 320. Real-time indexer 315 acts to index the events of the event stream to determine one or more characteristics of the events. Batch indexer 320 performs a number of batch processes on the event stream. In some instances the batch processes performed on the event stream may be based on machine learning.

The output from the real-time indexer 315 and batch indexer 320 is communicated to the interaction graph generator 110. The interaction graph generator 110 uses the received information to generate a data structure that indexes or places in a graph information about users associated with events received via the event stream. This graph may be referred to as an "interaction graph." FIG. 3 and the associated description below provide further details regarding the interaction graph. In some embodiments, the data structure may include a status for one or more of the users and, in some instances, the status of the users may be updated on an ongoing basis using the events received via the event stream. An exemplary status for a user may be "online now," "offline," "accessing a particular webpage," "clicking on an icon." etc.

In some embodiments, a designer may access the information graphed and/or indexed by and/or stored in interaction graph generator 110 so as to, for example, establish one or more parameters for a messaging campaign, personalized merchandising scheme, and/or a message delivery mechanism. Such access may be provided by, for example a graphical user interface, such as interfaces 400-800, which are discussed in more detail below with regard to FIGS. 4-8B.

Dynamic segmentation engine 120 may also include a segments database 325 and a user information server 340.

The user information server 340 may store and/or access a user list, which may be correlated with user identifying information as well as one or more characteristics of a number of users. In some embodiments, the user information may be received from the interaction graph generator 110. Segments database 325 may include information regarding the characteristics and/or parameters for various users and/or segments of users. The dynamic segmentation engine 120 may determine which users of the user list are eligible for a particular messaging campaign (i.e., comply with the parameters defining the particular messaging campaign) and/or personalized merchandising scheme and may provide identification information corresponding to users who are eligible for a particular campaign and/or personalized merchandising scheme. The identification information may be used to contact the user and/or send the message of the messaging campaign and/or personalized merchandising scheme to the user and may include, for example, user UUIDs and related channel identifiers, email addresses, device_tokens for mobile push notifications, display RTB ids, phone numbers for SMS text messaging, etc. The identification information may be communicated to the campaign engine 125 for addressing a message of a message campaign and/or personalized merchandising scheme.

An exemplary process for designing personalized merchandising schemes and/or providing a message defined by a personalized merchandising scheme to a user will now be discussed. This exemplary process and/or any portion thereof may be executed by, for example, system 100 and/or any component thereof.

A catalog of items, such as catalog data 305, may be received and/or accessed by, for example, marketing engine 105 and/or dynamic segmentation engine 120. The items may be, for example, products (e.g., tangible products or electronically delivered products, such as computer software) or services (e.g., educational services or financial services). The catalog may include, for example:

1. A definition of the item;
 2. A identification number for the item (e.g., serial number, SKU number);
 3. A color of the item;
 4. A size of the item;
 5. A description of the content of the item;
 6. A cost of the item;
 7. A quantity of the item that is available; and
 8. Instructions regarding how to use the item.

A designer may provide one or more parameters for a messaging campaign and/or personalized merchandising scheme to, for example, marketing engine 105 and/or campaign engine 125. The parameters may be updated at any time. Often, the parameters will include criteria for the selection of an event from an event stream and/or a user associated with a particular event based on one or more characteristics of the event and/or a user associated with the event. Exemplary parameters for the selection of an event and/or a user associated with an event include:

1. Time of day the event occurs;
 2. Geo-location of a user device, like user device 150a-150n, from which an event is received when the event occurs;
 3. Type of event (e.g., clicking on an icon provided by a designer's website, making an offer to purchase an item via an online auction, comparing two or more products or services, searching for an item, etc.);
 4. Historical data regarding a user associated with an event (e.g., online purchasing history, frequency of SMS text messaging, frequency of engaging in a conversation with an online provider of goods, etc.);
 5. An indication that a user associated with an event has shown interest in purchasing a particular good or service (e.g., placed an item in an online shopping cart, requested further information via an online inquiry, etc.);
 6. A demographic characteristic of a user associated with an event;
 7. A type of device by which a user creates an event;
 8. A communication channel by which an indication of the event and/or event data is received; and
 9. A characteristic of an item a user has purchased or has shown an interest in purchasing.

Parameters may also relate to one or more aspects of a message to be delivered to a user associated with an event in response to receiving an event that matches one or more of the parameters for selecting an event. Exemplary parameters for a message include, but are not limited to:

1. Message format;
 2. Message branding;
 3. Mode/channel of message delivery (e.g., email, SMS text message, invitation to participate in an online chat session, etc.);
 4. Message content (e.g., an offer for a discount or coupon, a suggestion for an add-on item to purchase in addition to purchasing an item that triggered a particular received event, etc.); and
 5. When the message should be delivered (e.g., instantaneously, within a given time period, in response to a second received event with one or more particular characteristics, etc.).

In some instances, the parameters for a personalized merchandising scheme may be received via a designer interface 155 using one or more GUI, such as GUI 400-800 as will be discussed below with reference to FIGS. 4-8B.

An event stream may be received by, for example, marketing engine 105 from, for example, event source 160 and/or one or more user devices 150a-150n. The event stream may include a plurality of events representative of a plurality of user's interactions with a resource or catalog that may be affiliated with a designer.

The events provided by the event stream may be analyzed to determine one or more characteristics associated therewith. The analysis may include execution of one or more REST APIs, like REST APIs 310 and/or execution of one or more indexing processes as may be performed by real-time indexer 315 and/or batch indexer 320. Often times, this analysis of events will include a normalization of the events so that they may be placed in a standard format for further analysis and/or indexing. REST APIs 310 may perform this normalization.

In some instances, real-time indexer 315 may analyze the events of the event stream to determine one or more characteristics thereof, such as user identity, geo-location of event occurrence, type of event (e.g., purchase, view, placing in an electronic shopping cart, etc.), method of payment for a good or service, number of recurrent visits to the designer's website, (e.g., how many times the user viewed a particular video), etc.

On some occasions, one or more batch processes may be executed on a plurality of events in the event stream. Batch indexer 320 may execute the batch processing. In some embodiments, batch processes may be performed on, for example, a copy of the interaction graph and/or raw (i.e., unprocessed) event data at intervals in order to, for example, determine user information and/or characteristics that may be added to, or written into, the interaction graph.

In some instances, the batch processing employs machine learning to iterate and modify the batch processes performed. In one embodiment, machine learning may be employed during batch processing to develop a user propensity score, such as a user's "repeat purchase score" which may serve to, for example, indicate how likely is for the user to make a repeat purchase within a time period (e.g., 30 days, 60 days, etc.). Machine learning may also be applied to batch processes to determine, for example, a user's churn score or category affinity scores. A churn score is a type of predictive score that may be built through machine learning. In some embodiments, a churn score may indicate the likelihood of occurrence for a particular user behavior, including, but not limited to, purchasing an item, repeating a purchase of an item, time spent engaging with a website or catalog item, returning to a website, viewing information regarding an item or a category of items, etc. A category affinity score may indicate a user's affinity for a particular category or characteristic of, for example, a good or service provided in a catalog. Additionally, or alternatively, machine learning may be applied to batch processes to determine, for example, predictive recommendations for a user responsively to, for example, a user and/or event characteristic. This may be accomplished by, for example, using machine learnt collaborative filtering of arrays of events and/or users and/or characteristics of events and/or users to select for events and/or users that meet certain criteria (e.g., a user who viewed a particular catalog item or purchased a particular item). The analysis may further include generation of an interaction graph by, for example, interaction graph generator 110 using, for example, the output of the real-time indexer 315 and/or the batch indexer 320. The interaction graph generated by the interaction graph generator 110 may include fully indexed data regarding users as they are correlated with events in the event stream and items included within a catalog.

A message may be prepared for distribution to one or more particular user(s) based on, and responsively to, an event associated with the particular user(s). The message may be prepared by, for example, dynamic segmentation engine 120 and/or merchandising engine 115 in response to, for example, instructions received from campaign engine 125 regarding one or more aspects of a messaging campaign and/or personalized merchandising scheme.

In some embodiments, a type of message to be received by a user associated with a particular event may be selected and/or defined based on a characteristic of the event. For example, if a characteristic of the particular event is that a user placed a product in an electronic shopping cart but did not purchase the item within 20 minutes of placing the product in the electronic shopping cart, the dynamic segmentation engine 120 may select a type of message to deliver to the user.

In one embodiment, a plurality of messages that comply with a plurality of personalized merchandising schemes may be preconfigured and a data structure that stores the plurality of preconfigured messages may be built. Then, a personalized merchandising scheme for an event in the event stream may be selected and this selection may include accessing a preconfigured message stored in the data structure that corresponds with a selected personalized merchandising scheme. The preconfigured message may then be communicated to a user associated with a particular event.

A communication channel (e.g., email, mobile notification deliver, SMS text message, chat conversation channel, etc.) for a message may be selected by, for example, campaign engine 125 and/or merchandising engine 115. Then, the message may be provided to a user associated with a particular event and/or a group of users associated with the event and/or a similar event.

Figure 3:
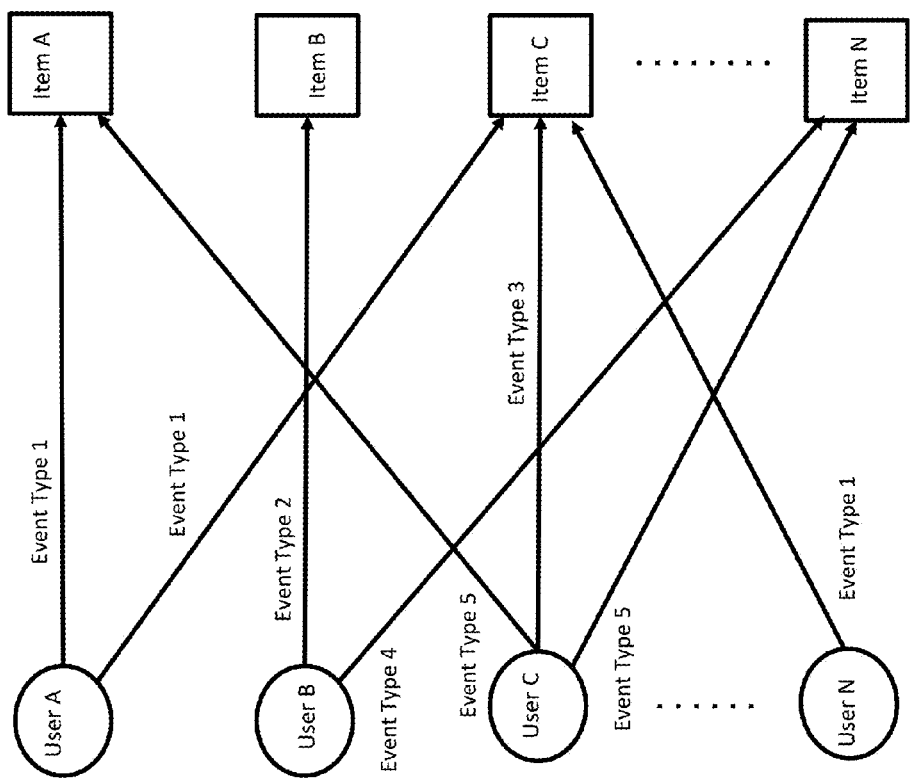
FIG. 3 is a merchandising scheme/event graph.

FIG. 3 provides an exemplary interaction graph 300 that depicts relationships between Users A-N, event types 1-5, and Items A-N as defined by one or more personalized merchandising schemes. In some instances, interaction graph 300 may be generated by interaction graph generator 110 and may be interaction graph. As used herein, the identifier "N" represents a set of, for example, users, user devices, and/or items that extends to a nearly infinite number of users, user devices, and/or items as may be defined by, for example, a capacity of the system 100 or the availability of user, user device, and/or item data.

Each of Users A-N may be associated with various criteria including, but not limited to, geo-location, recent purchases, Internet browsing history, items added to an electronic wish list, a prediction regarding future user behavior, a prediction regarding a future event to be executed by the user, a confidence score regarding, for example, one or more predictions, a previous purchase of the user, a characteristic of a user device, such as user devices 150a-150n, a particular User A-N is using, and so on.

Interaction graph 300 also includes Items A-N, which may be provided by, for example, catalog data 305 and/or marketing engine 105. Items A-N may be associated with one or more characteristics such as a SKU number, a serial number, a color, brand name, manufacturer, price, quantity available, product characteristics.

When an event is received via the event stream from, for example, event source 160 and/or one or more of user devices 150A-150N one or more characteristics of the event may be determined. The events may be characterized based on this determination as belonging to a particular event type, such as event types 1-5. Although only 5 event types are depicted in interaction graph 300, this need not be the case as a personalized merchandising scheme/event graph like interaction graph 300 may accommodate any number of event types.

Receipt of an event from the event stream, and a subsequent determination of the event type for the event, may trigger the pairing, or indexing, of a particular User A-N with one or more Items A-N so that a message regarding the paired Item A-N may be accessed from a data structure of preconfigured messages and/or prepared and delivered to the particular User A-N according to the criteria defining one or more personalized merchandising schemes that are associated with the event type.

In one embodiment, a personalized merchandising scheme may be personalized and/or specific to each event type. According to this embodiment, the relationships between Users A-N and Items A-N of interaction graph 300 may be defined by five different personalized merchandising schemes because interaction graph 300 provides five different event types, and the merchandising scheme for each of the five event types defines the relationships between Users A-N and Items A-N.

In the example provided by interaction graph 300, an event corresponding to an event type 1 is received from/associated with User A and the personalized merchandising scheme for event type 1 dictates that a user with the one or more characteristics in common with User A should receive a message regarding Item A and Item C. Additionally, personalized merchandising scheme for event type 1 dictates that when an event is received from and/or is associated with a user with the one or more characteristics in common with User N, User N should receive a message regarding Item C. The same personalized merchandising scheme may also define, for example, the content, format, delivery timing, and/or channel of delivery for the message.

A second personalized merchandising scheme that is personalized to event type 2 may dictate that when a received event that may be characterized as an event type 2 is received from and/or is associated with a user matching one or more characteristics of User B, User B should receive a message regarding Item B.

A third personalized merchandising scheme that is personalized to event type 3 may dictate that when a received event that may be characterized as an event type 3 is received from and/or is associated with a user matching one or more characteristics of User C, User C should receive a message regarding Item C.

A fourth personalized merchandising scheme that is personalized to event type 4 may dictate that when a received event that may be characterized as an event type 4 is received from and/or is associated with a user matching one or more characteristics of User B, User B should receive a message regarding Item N.

A fifth personalized merchandising scheme that is personalized to event type 5 may dictate that when a received event that may be characterized as an event type 5 is received from and/or is associated with a user matching one or more characteristics of User C, User C should receive a message regarding Item A and Item N.

Additionally, or alternatively, a message for each event type may be preconfigured for each of items A-N and stored in a data structure or database so that when an event matching a particular event type is received, a preconfigured message may be quickly and efficiently selected and communicated to the user as a rapid response to the received event.

FIGS. 4-8B provide screen shots of exemplary GUI 400-800 by which a designer may design a personalized merchandising scheme and/or advertising campaign. In some embodiments, one or more of GUI 400-800 may be provided by designer interface 155. Information collected via interfaces 400-800 may be used by, for example, campaign engine 125 and/or marketing engine 105 to design and implement a messaging campaign and/or personalized merchandising scheme wherein the messages are highly specialized according to, for example, event characteristics as well as users who are associated with a triggering event.

Figure 4:
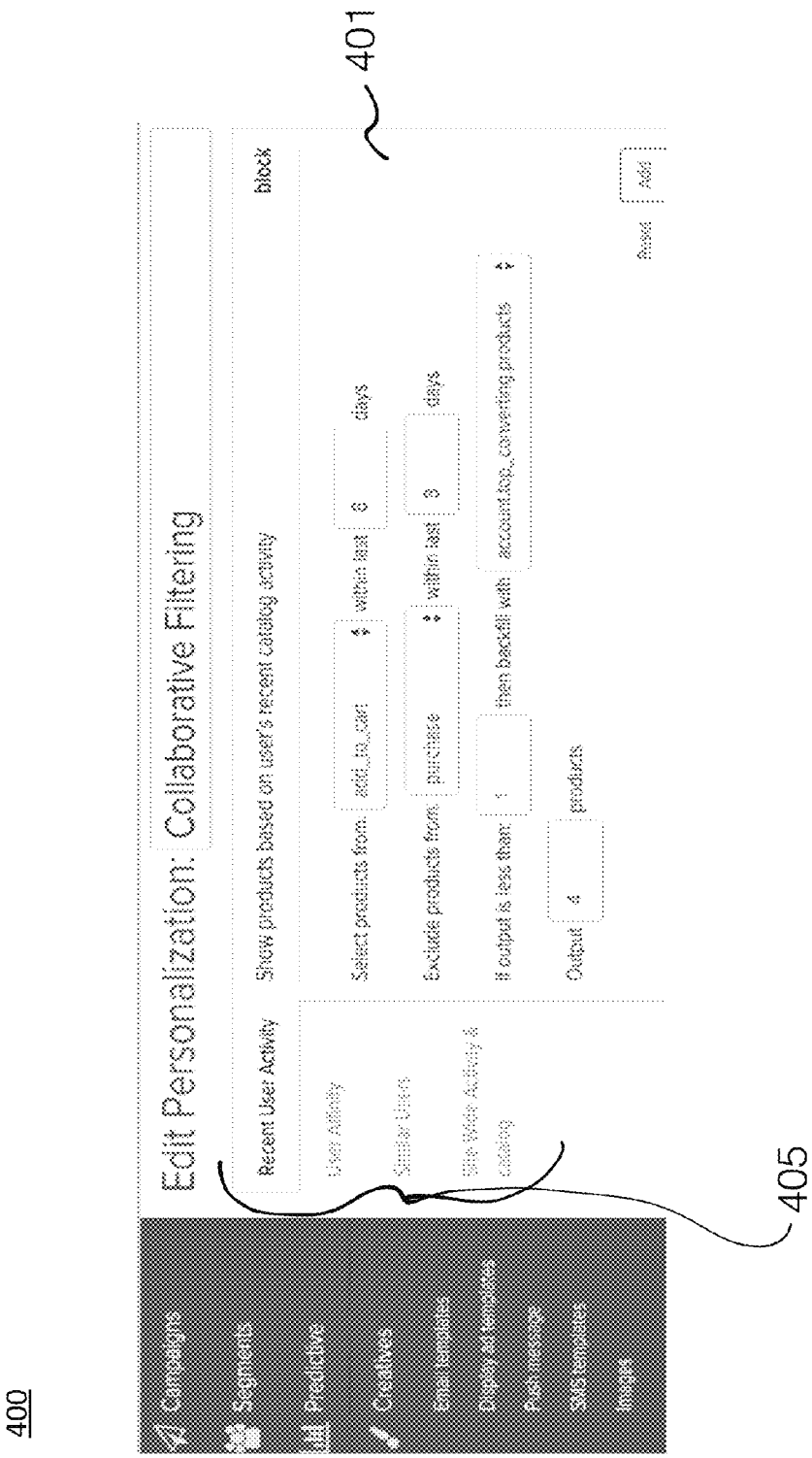
FIGS. 4-8B are screen shots of exemplary GUI, in accordance with some embodiments of the invention.

More specifically, FIG. 4 provides an interface 400 by which a designer may select parameters for collaborative filtering of recent user activity. For example, a designer may select a number of characteristics and/or parameters for a messaging campaign and/or personalized merchandising scheme from a menu of one or more personalization categories 405. Using menu 405, a designer may select a category for a messaging campaign and/or personalized merchandising scheme. Menu 405 provides four interface categories, recent user activity, user affinity, similar users, and site wide activity and catalog.

Interface 400 provides a designer window 401 of designer selectable options that are provided upon selection of the recent user activity menu category. Exemplary selectable options provided by window 401 include drop down menus for event selection regarding user activity associated with a particular event that has the characteristic of a product option being selected (e.g., add to cart) within a given time period (e.g., within the last 8 days). Window 401 also provides a designer with the option of excluding products that have been, for example, purchased within a given time period (e.g., within the last 8 days).

Figure 5A:
Figure 5B:
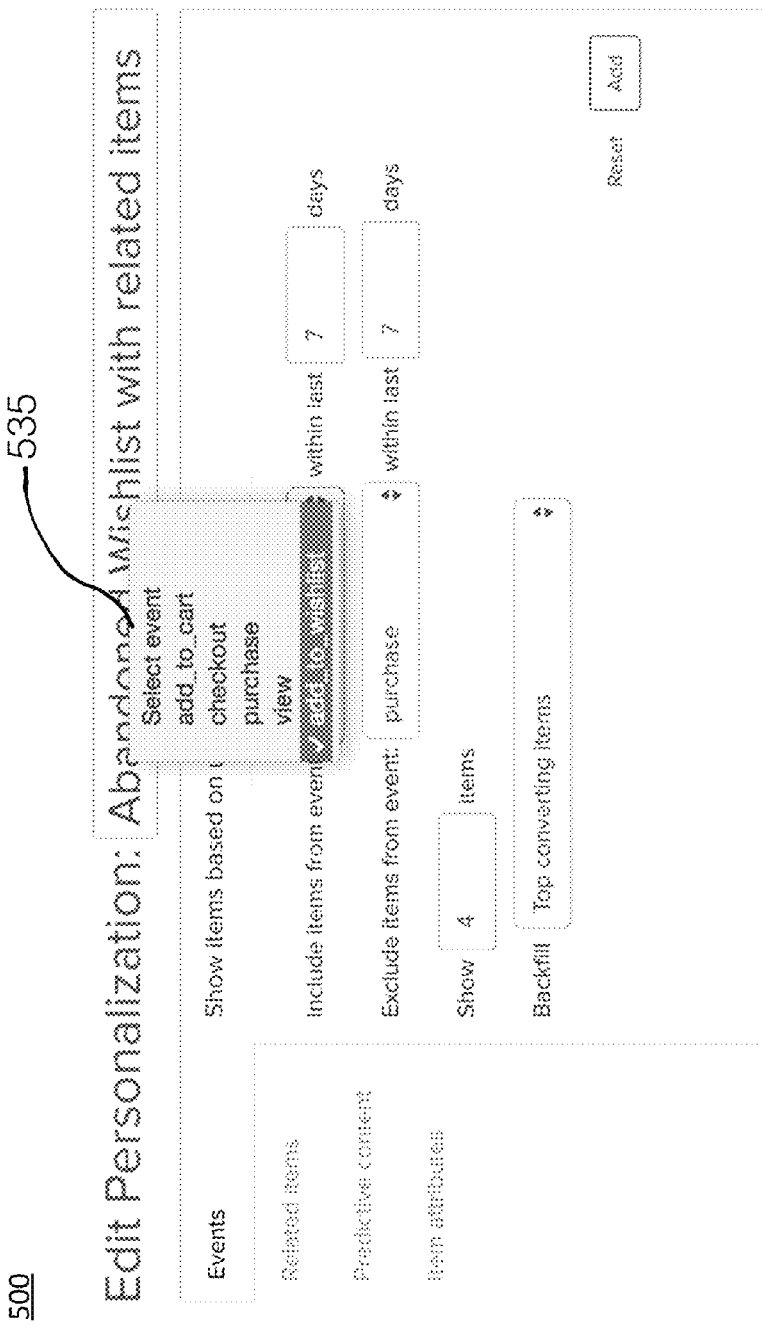
Figure 5C:
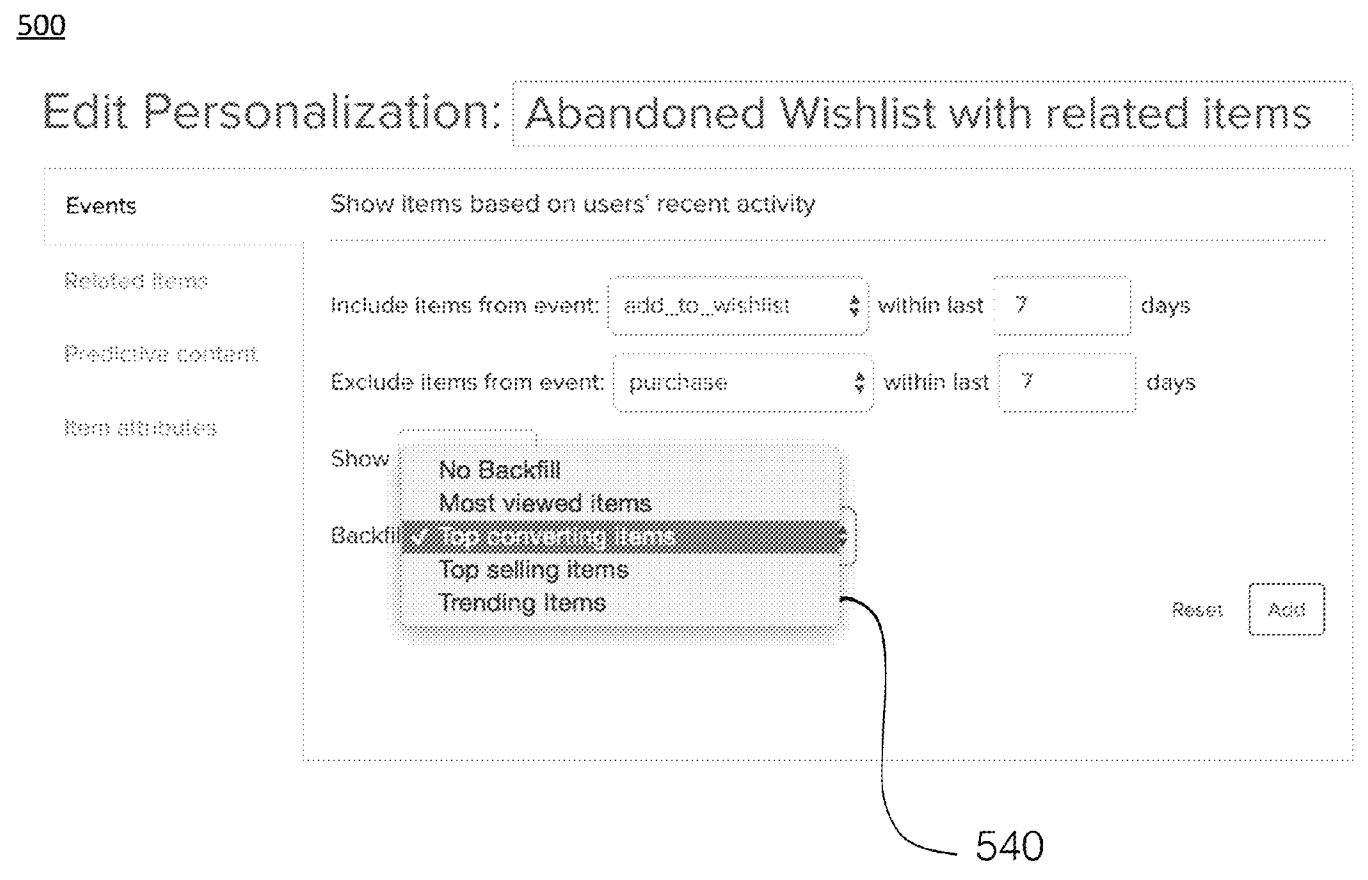

FIGS. 5A-5C provide exemplary screen shots of an events interface 500. Events interface 500 includes a text box that names a personalized merchandising scheme "abandoned wishlist with related items." The events interface 500 enables a designer to define event characteristics/parameters for a personalized merchandising scheme and/or messaging campaign. For example, events interface 500 provides an "include items from event," dropdown menu 505 that enables a designer to select the type of event to be included in an personalized merchandising campaign and a dropdown menu by which a designer may select a time frame within which the event occurs 510 (e.g., 2 days, 7 days, 2 hours, etc.). Events interface 500 also provides an "exclude items from event," dropdown menu 515 that enables a designer to select the type of event not to be included in an personalized merchandising campaign and a dropdown menu by which a designer may select a time frame within which the event does not occur 520 (e.g., 2 days, 7 days, 2 hours, etc.). Events interface 500 further provides a dropdown menu that enables a designer to select how many items to show 525 and a backfill dropdown menu 530 that enables a designer to select a number of items that may be included to complete a message if there are not enough, for example, items or portions of information to be included in the message. For example, if a message template has four slots for items to be sent in response to receiving a particular event or event type but there are only two items that meet the criteria of the personalized merchandising scheme, a selection made via the backfill dropdown menu 530 enables the other two available slots to be filled with content from a broader type of merchandising. FIG. 5B provides a view of interface 500 with the dropdown menu 505 expanded to show a list 535 of exemplary options for selecting items to be included from an event, such as "add_to_cart," "checkout," "purchase," "view," "add_to_wishlist," and the default option of "select event." FIG. 5C provides a view of interface 500 with the backfill dropdown menu 525 expanded to show a list 540 of exemplary options for selecting backfill events, such as "most viewed items," "top converting items," "top selling items," "trending items," and the default option of "no backfill."

Figure 6A:
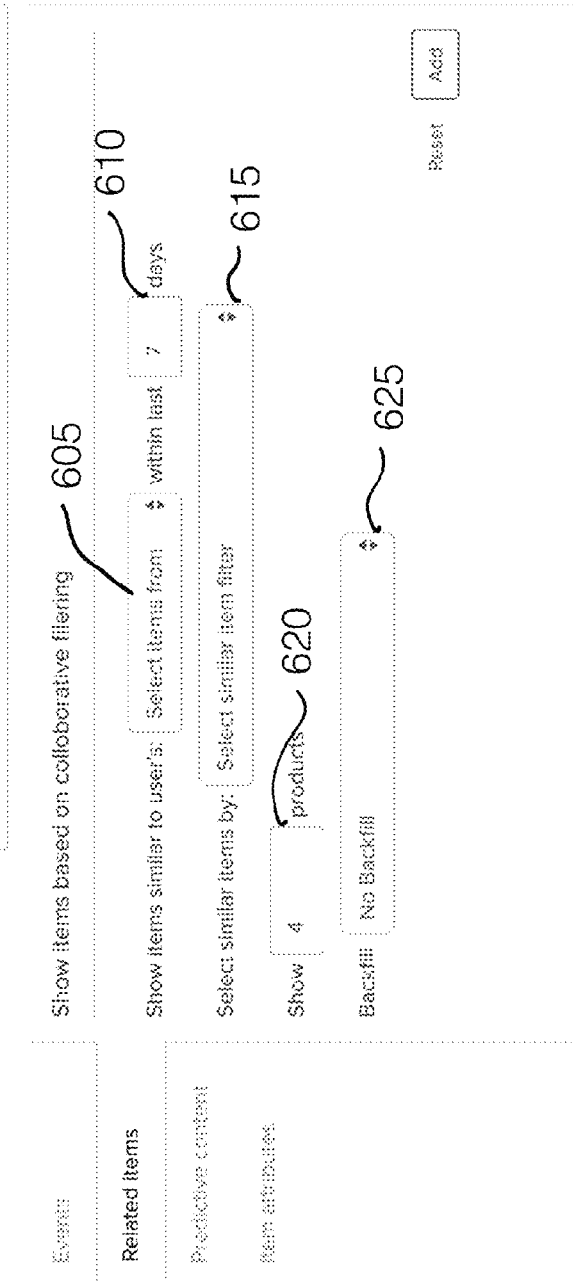
Figure 6B:
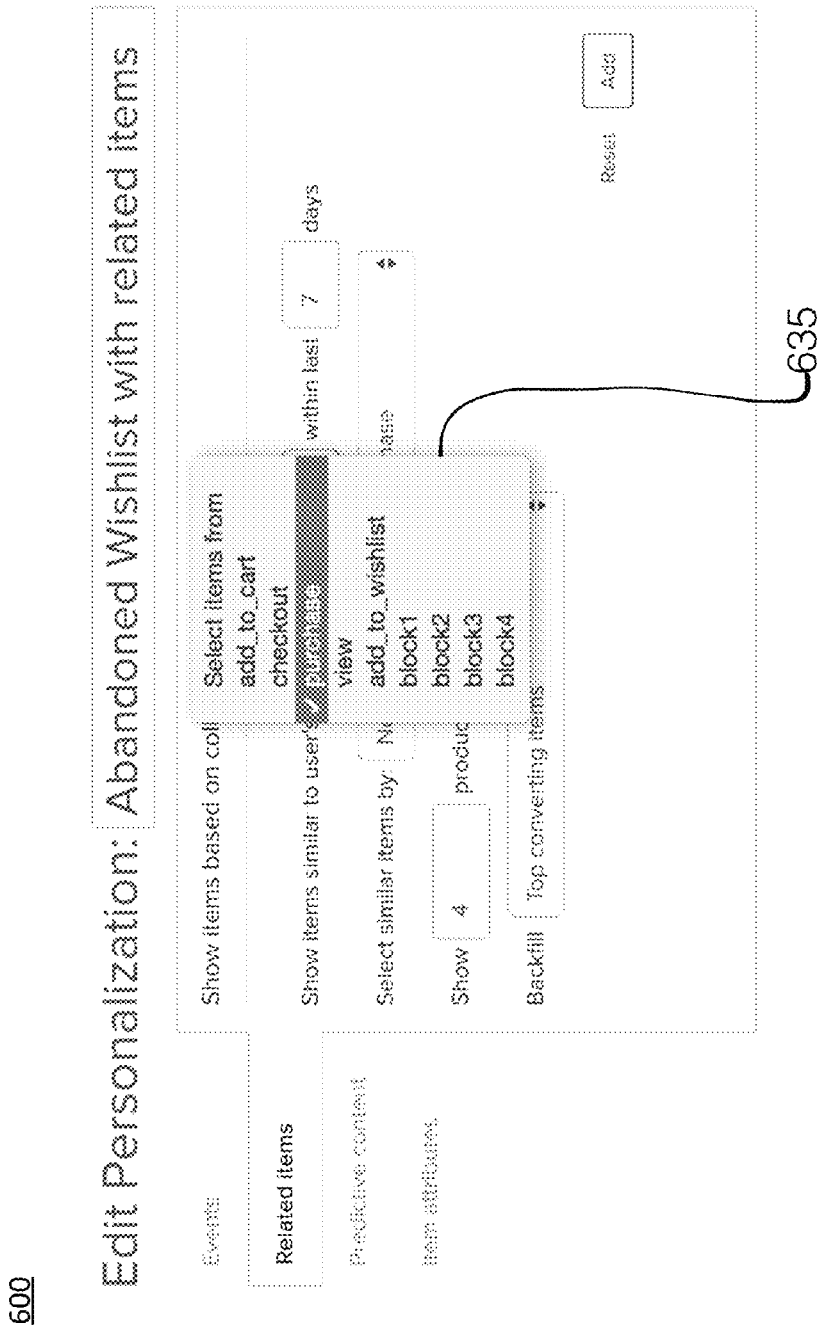
Figure 6C:
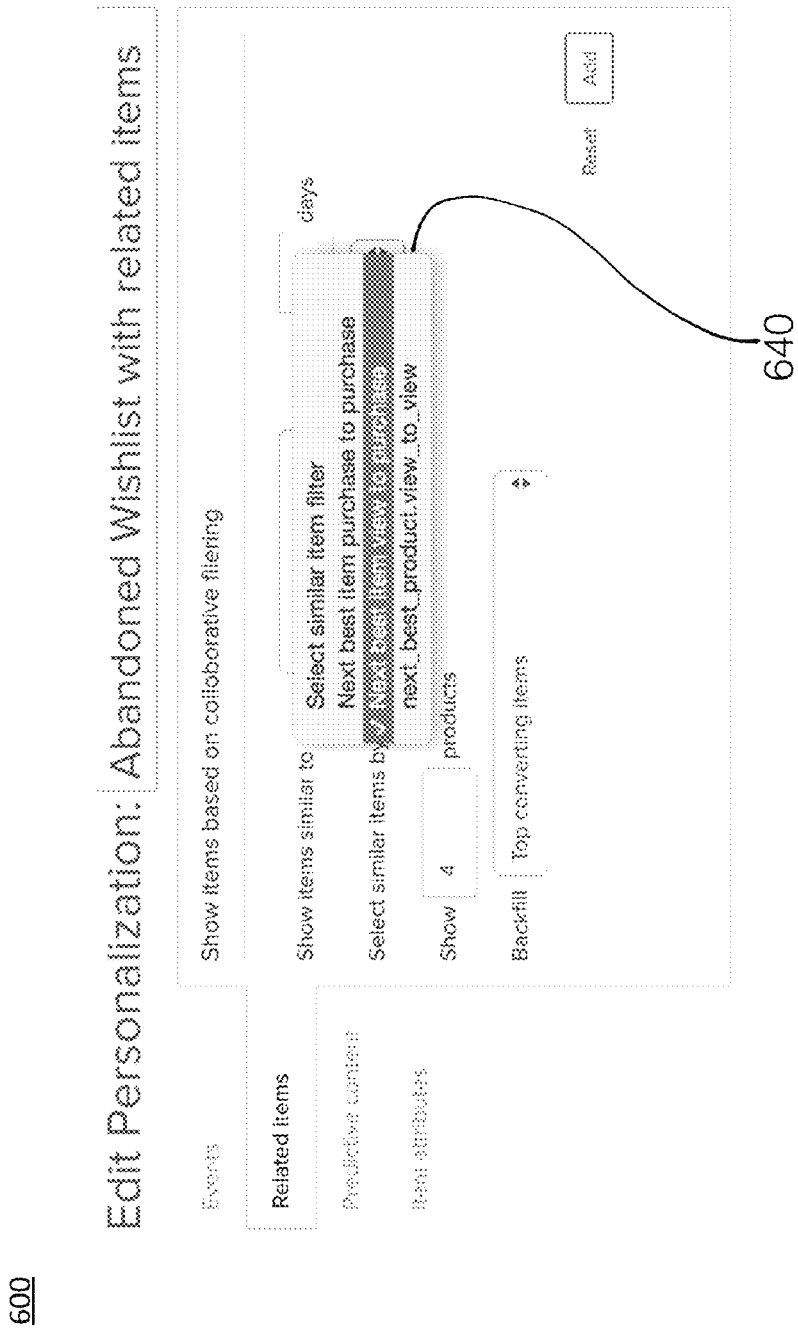

FIGS. 6A-6C provide exemplary screen shots of a related items interface 600. The related items interface 600 enables a designer to define content for a message included in a merchandising campaign. For example, interface 600 provides a "show items similar to user's:" dropdown menu 605 that enables a designer to select the type of items to be included in a message to a user and a dropdown menu by which a designer may select a time frame within which the event or item selected in the dropdown menu 605 occurs 610 (e.g., 2 days, 7 days, 2 hours, etc.). Events interface 600 also provides a "select similar items by," dropdown menu 615. Events interface 600 further provides a dropdown menu that enables a designer to select how many items to show 620 and a backfill dropdown menu 625 that enables a designer to select a number of items to add to a message when there are not enough items in the message that comply with the criteria of the personalized merchandising campaign. FIG. 6B provides a view of interface 600 with the dropdown menu 605 expanded to show a list 635 of exemplary options for showing items similar to a user's event, such as "add_to_cart," "checkout," "purchase," "view," "add_to_wishlist," and the default option of "select items from." Dropdown menu 605 also includes options for selecting block1, block2, block3, and block4. FIG. 6C provides a view of interface 600 with the "select similar items by," dropdown menu 615 expanded to show a list 640 of exemplary options for selecting similar items, such as "next best item purchase to purchase," "next best item view to purchase," "next_best-_product_view_to_view," "and the default option of "select similar item filter."

Figure 7A:
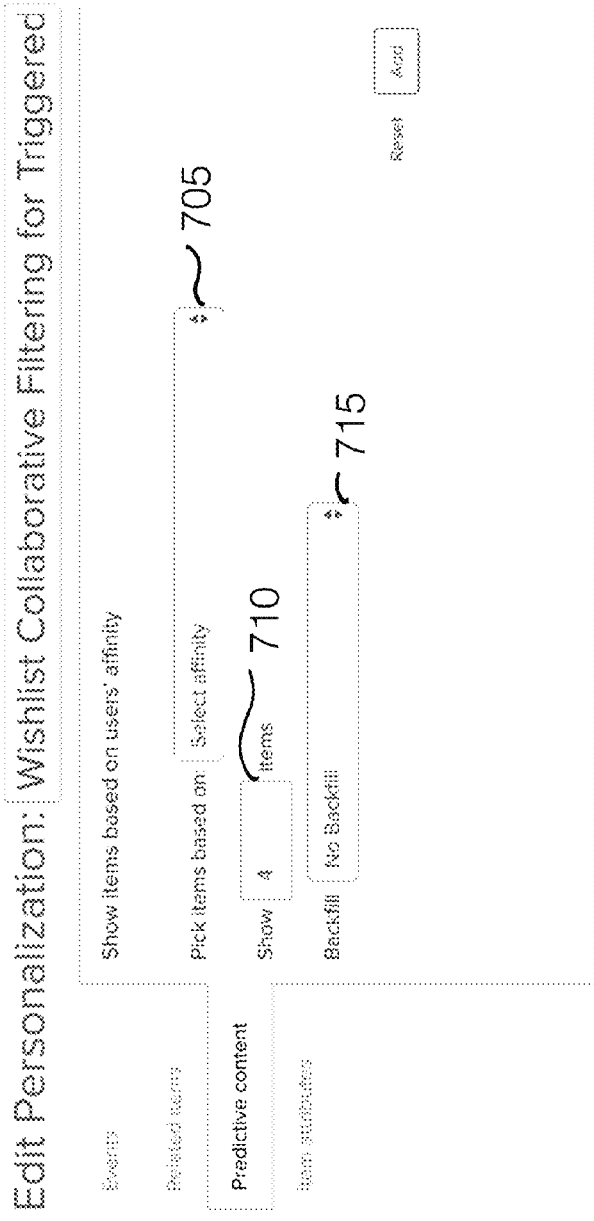
Figure 7B:
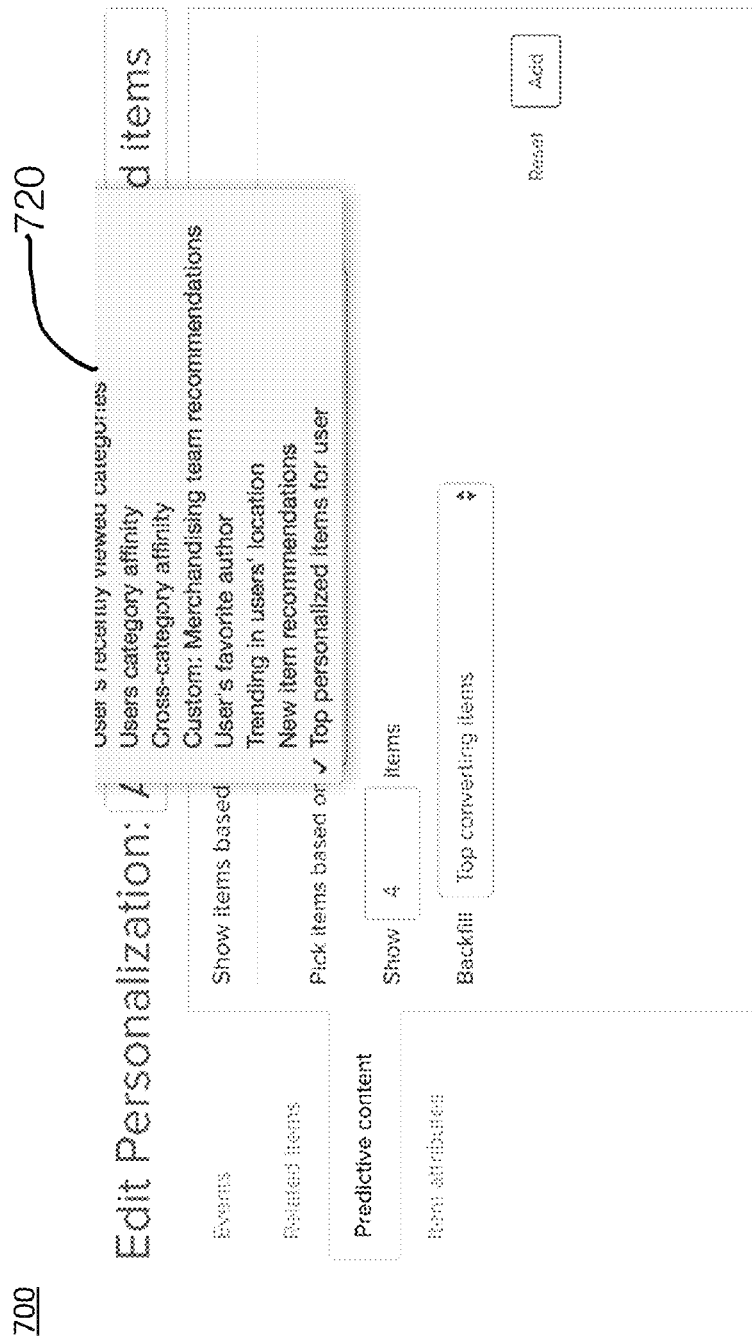

FIGS. 7A and 7B provide exemplary screen shots of a predictive content interface 700. The predictive content interface 700 enables a designer to define content for a message included in a merchandising campaign. For example, interface 700 provides an "pick items based on," dropdown menu 705 that enables a designer to select the type of items to be included in a message to a user and a dropdown menu by which a designer may select a number of items to show 710 and a backfill dropdown menu 715 that enables a designer to select a number of items to add to a message when there are not enough items in the message that comply with the criteria of the personalized merchandising campaign. FIG. 7B provides a view of interface 700 with the dropdown menu 705 expanded to show a list 720 of exemplary options for picking items based on, for example, "user's recently viewed categories," "users category affinity," "cross-category affinity," "custom: merchandising team recommendations," "user's favorite author," "trending in users' location," "new item recommendations," and "top personalized items for user."

Figure 8A:
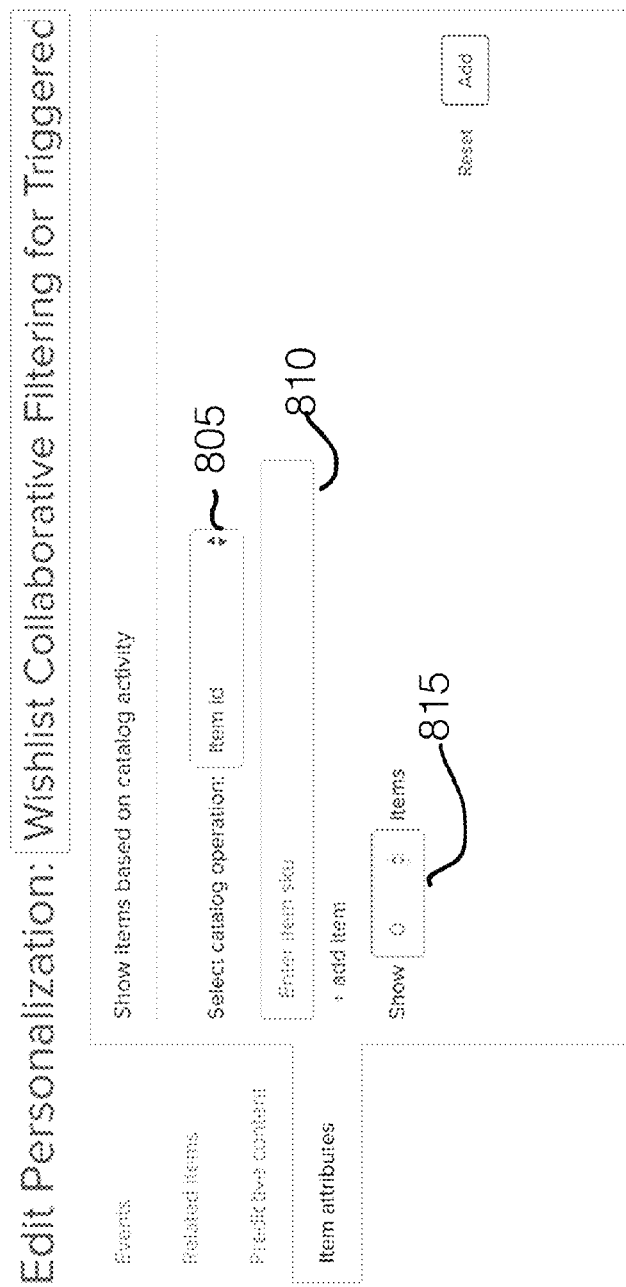
Figure 8B:
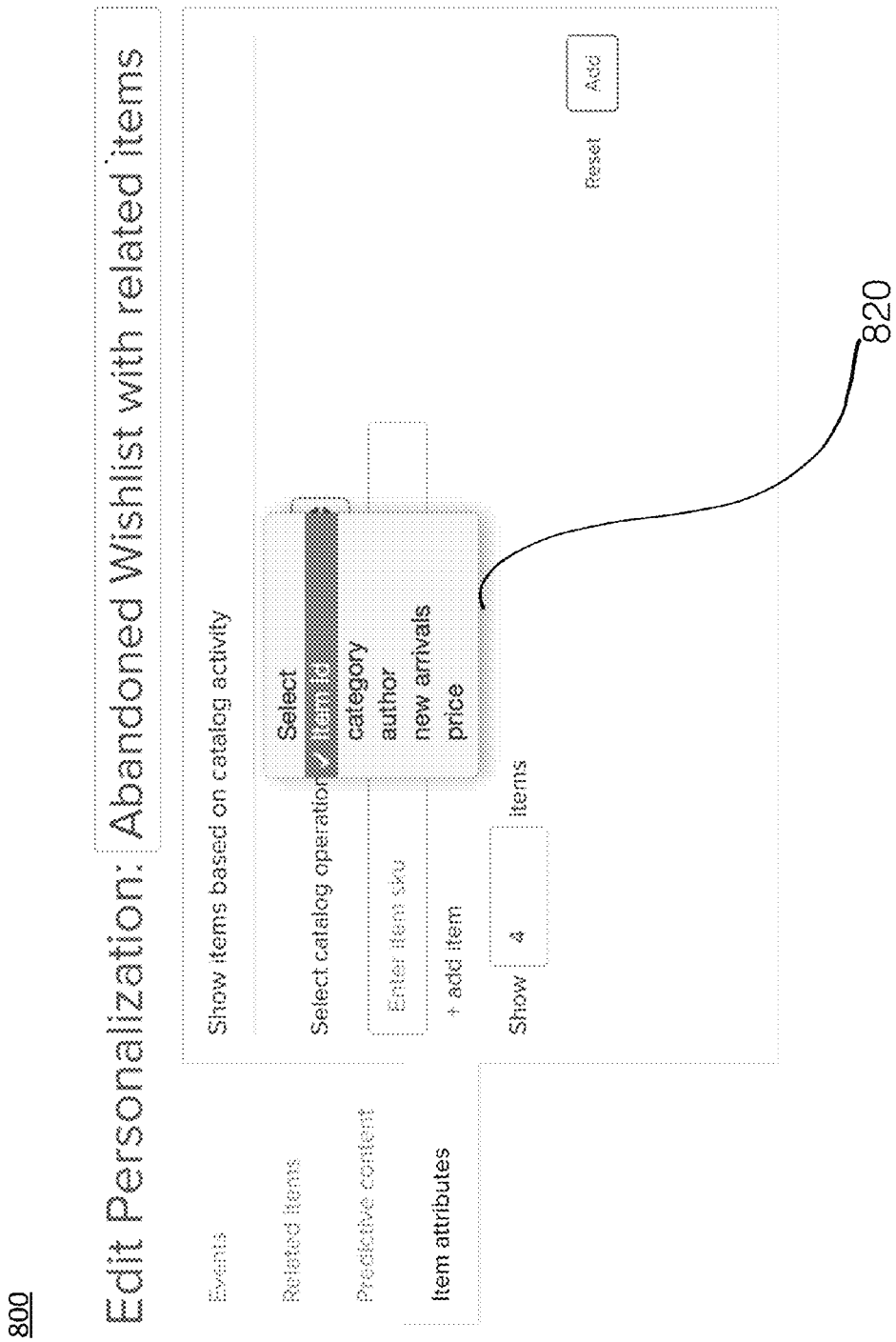

FIGS. 8A and 8B provide exemplary screen shots of an item attributes interface 800. The item attributes interface 800 enables a designer to define content for a message included in a merchandising campaign. More specifically, interface 800 enables a designer to define items to be shown in a message based on catalog activity. For example, interface 800 provides an "select catalog operation" dropdown menu 805 that enables a designer to select the type of catalog operations to be included in a message to a user, a text box 810 by which a designer may enter a SKU number, and a dropdown menu by which a designer may select a number of items to show 815. FIG. 8B provides a view of interface 800 with the dropdown menu 805 expanded to show a list 820 of exemplary options for selecting catalog operations based on, for example, "item id," "category," "author," "new arrivals," "price," and the default entry of "select."

Hence, an improvement in computer-related technology has been herein described. More specifically, systems and methods for designing personalized merchandising schemes that are responsive to events received in an event stream and systems and methods for providing a message defined by a personalized merchandising scheme to a user associated with a particular event received in an event stream have been described.

The invention claimed is:

1. A computer-implemented method, comprising:
    accessing, by a processor, catalog data stored in a catalog database, the catalog data including information regarding each of a plurality of goods or services;
    receiving, by the processor, a plurality of personalized merchandising schemes, wherein each of the personalized merchandising schemes defines:
        content for a message, the content of the message referencing information regarding a good or service included in the catalog data;
        characteristics of an event from an event stream for which the message should be selected, each of the events in the event stream being associated with one or more event characteristics and an individual user;
        a format for the content of the message; and
        a channel of communication for the message;
    receiving, by the processor, an event stream, the event stream including a plurality of events, wherein the events in the event stream are initiated by a plurality of users;
    determining, by the processor, characteristics of a particular event in the event stream by executing a representational state transfer ("REST") application programming interface ("API"), the particular event being associated with a particular user of the plurality of users;
    selecting, by the processor, a personalized merchandising scheme from the plurality of personalized merchandising schemes based on the determined characteristics, wherein the determined characteristics comprise (i) a geo-location and a type of a user device from which the particular event was received and (ii) a communication channel by which the particular event was received from the user device;
    generating, by the processor, a message using the selected personalized merchandizing scheme, the generated message including the content defined by the selected personalized merchandizing scheme and the format defined by the selected personalized merchandizing scheme for the message; and
    providing, by the processor, the generated message in the format defined by the selected personalized merchandizing scheme to the particular user using the communication channel defined by the selected personalized merchandizing scheme.

2. The computer-implemented method of claim 1, further comprising:
    providing, by the processor, a graphical user interface that enables a designer to define a set of parameters for a personalized merchandising scheme.

3. The computer-implemented method of claim 1, wherein a designer of the plurality of personalized merchandising schemes provides the catalog data.

4. The computer-implemented method of claim 1, wherein the events represent user interactions with the catalog data.

5. The computer-implemented method of claim 1, wherein the event stream is received from a plurality of user devices.

6. The computer-implemented method of claim 1, the determination further comprising:
    creating, by the processor, an interaction graph using the events by executing at least one of the REST API, a batch process, and a real-time indexing process.

7. The computer-implemented method of claim 1, wherein the determination further comprises executing a batch process that processes a group of events over a time interval.

8. The computer-implemented method of claim 1, further comprising:
    creating, by the processor, a data structure that indexes a status for users associated with events received in the event stream.

9. The computer-implemented method of claim 1, further comprising:
    creating, by the processor, a data structure that indexes a status for users associated with events received in the event stream; and
    updating, by the processor, the data structure that indexes a status for users associated with events received in the event stream to reflect a change in status for an indexed user as indicated by a subsequently received event in the event stream associated with the respective indexed user.

10. The computer-implemented method of claim 1, further comprising:
preconfiguring, by the processor, a plurality of messages that comply with a corresponding plurality of personalized merchandising schemes;
building, by the processor, a data structure that stores the plurality of messages, wherein:
selecting by the processor, the personalized merchandising scheme further includes accessing a preconfigured message stored in the data structure that corresponds with the selected personalized merchandising scheme and providing the message includes communicating the accessed preconfigured message to the user associated with the particular event.

11. The computer-implemented method of claim 1, wherein the criteria for selection of an event from an event stream to which the message is responsive includes inclusion of a first characteristic in the event and exclusion of second characteristic from the event.

12. The computer-implemented method of claim 1, wherein an event received in the event stream is a response of the user associated with the particular event to the message, the method further comprising:
creating, by the processor, an interaction graph using the events stream by executing at least one of the REST API, a batch process, and a real-time indexing process.

13. A computer-implemented method, comprising:
accessing, by a processor, catalog data stored in a catalog database, the catalog data including information regarding each of a plurality of goods or services;
receiving, by the processor, a plurality of personalized merchandising schemes, wherein each of the personalized merchandising schemes defines:
content for a message, the content of the message referencing information regarding a good or service included in the catalog data;
characteristics of an event from an event stream for which the message should be selected, each of the events in the event stream being associated with one or more event characteristics and an individual user;
a format for the content of the message; and
a channel of communication for the message;
creating, by the processor, a data structure that correlates personalized merchandising schemes with event data characteristics;
receiving, by the processor, an event stream, the event stream including a plurality of user-initiated events;
determining, by the processor, characteristics of a particular event in the event stream by executing a representational state transfer ("REST") application programming interface ("API");
accessing, by the processor, the data structure to retrieve a personalized merchandising scheme that correlates with the determined characteristics of the particular event, wherein the determined characteristics comprise (i) a geo-location and a type of a user device from which the particular event was received and (ii) a communication channel by which the particular event was received from the user device;
generating, by the processor, a message according to the retrieved personalized merchandising scheme, the generated message including the content defined by the retrieved personalized merchandising scheme and the format defined by the retrieved personalized merchandising scheme for the message; and
communicating, by the processor, the generated message in the format defined by the retrieved personalized merchandising scheme to a user associated with the particular event using the communication channel defined by the retrieved personalized merchandising scheme.

14. The computer-implemented method of claim 13, further comprising:
providing, by the processor, a graphical user interface that enables a designer to define a set of parameters for a personalized merchandising scheme.

15. The computer-implemented method of claim 13, wherein a designer of the plurality of personalized merchandising schemes provides the catalog data.

16. The computer-implemented method of claim 13, wherein the events represent user interactions with the catalog data.

17. The computer-implemented method of claim 13, wherein the event stream is received from a plurality of user devices.

18. The computer-implemented method of claim 13, further comprising:
building, by the processor, an interaction graph of the events by executing at least one of the REST API, a batch process, and a real-time indexing process.

19. The computer-implemented method of claim 13, further comprising:
creating, by the processor, a data structure that indexes a status for users associated with events received in the event stream.

20. The computer-implemented method of claim 13, further comprising:
creating, by the processor, a data structure that indexes a status for users associated with events received in the event stream; and
updating, by the processor, the data structure that indexes a status for users associated with events received in the event stream to reflect a change in status for an indexed user as indicated by a subsequently received event in the event stream associated with the respective indexed user.

21. The computer-implemented method of claim 13, further comprising:
preconfiguring, by the processor, a plurality of messages that comply with a corresponding plurality of personalized merchandising schemes;
building, by the processor, a data structure that stores the plurality of messages, wherein:
selecting, by the processor, the personalized merchandising scheme further includes accessing a preconfigured message stored in the data structure that corresponds with the selected personalized merchandising scheme and providing the message includes communicating the accessed preconfigured message to the user associated with the particular event.

22. The computer-implemented method of claim 13, wherein the criteria for selection of an event from an event stream to which the message is responsive includes inclusion of a first characteristic in the event and exclusion of second characteristic from the event.

* * * * *